US008485629B2

(12) United States Patent
Iritani et al.

(10) Patent No.: US 8,485,629 B2
(45) Date of Patent: Jul. 16, 2013

(54) PRINTING APPARATUS, PRINTING METHOD, AND DATA GENERATING APPARATUS

(75) Inventors: Hinako Iritani, Kawasaki (JP); Hiroshi Tajika, Yokohama (JP); Yuji Konno, Kawasaki (JP); Takeshi Yazawa, Yokohama (JP); Satoshi Seki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 313 days.

(21) Appl. No.: 13/069,683

(22) Filed: Mar. 23, 2011

(65) Prior Publication Data

US 2011/0242176 A1  Oct. 6, 2011

(30) Foreign Application Priority Data

Apr. 2, 2010  (JP) ................................. 2010-086467

(51) Int. Cl.
  *B41J 2/205*  (2006.01)
(52) U.S. Cl.
  USPC ........................................................... 347/15

(58) Field of Classification Search
  None
  See application file for complete search history.

(56) References Cited

U.S. PATENT DOCUMENTS

| 7,847,977 | B2 | 12/2010 | Yano et al. | 358/2.1 |
| 2005/0122353 | A1 | 6/2005 | Yamazaki et al. | |
| 2008/0284808 | A1 | 11/2008 | Kano et al. | 347/12 |

FOREIGN PATENT DOCUMENTS

| JP | 2004-1410 | 1/2004 |
| JP | 3591534 | 11/2004 |

*Primary Examiner* — Stephen Meier
*Assistant Examiner* — Tracey McMillion
(74) *Attorney, Agent, or Firm* — Fitzpatrick, Cella, Harper & Scinto

(57) ABSTRACT

The first printing mode improves gloss uniformity by setting the colorless ink discharge amount to be equal to or smaller than a reference value A at a dark image portion in input image data, and performing normal discharge printing in which printing with a colorless ink starts before completion of printing with a color ink (FIG. 11C). The second printing mode implements a wide color reproductive range by setting the colorless ink discharge amount to be larger than A at the dark image portion, and performing post-discharge printing in which discharge of the colorless ink starts after completion of printing with the color ink (FIG. 11D).

11 Claims, 17 Drawing Sheets

THICK LINE : NO CL
DOTTED LINE : CL NORMAL DISCHARGE PRINTING
THIN LINE : CL POST-DISCHARGE PRINTING

FIG. 5

|  |  | INK | | | | | | | | | |
|---|---|---|---|---|---|---|---|---|---|---|---|
|  |  | 1 | 2 | 3 | 4 | 5 | 6 | 7 | 8 | 9 | 10 |
| PIGMENT DISPERSION | 1 | 40 |  |  |  |  |  |  |  |  |  |
|  | 2 |  | 8 |  |  |  |  |  |  |  |  |
|  | 3 |  |  | 20 |  |  |  |  |  |  |  |
|  | 4 |  |  |  | 8 |  |  |  |  |  |  |
|  | 5 |  |  |  |  | 40 |  |  |  |  |  |
|  | 6 |  |  |  |  |  | 40 | 20 | 8 |  |  |
|  |  |  |  |  |  |  |  |  |  | 20 | 20 |
| GLYCERIN |  | 5.0 | 5.0 | 5.0 | 5.0 | 5.0 | 5.0 | 5.0 | 5.0 | 5.0 | 5.0 |
| DIETHYLENE GLYCOL |  | 5.0 | 5.0 | 5.0 | 5.0 | 5.0 | 5.0 | 5.0 | 5.0 | 5.0 | 5.0 |
| POLYETHYLENE GLYCOL 1000 |  | 5.0 | 5.0 | 5.0 | 5.0 | 5.0 | 5.0 | 5.0 | 5.0 | 5.0 | 5.0 |
| SULFINOL 465 |  | 1.0 | 1.0 | 1.0 | 1.0 | 1.0 | 1.0 | 1.0 | 1.0 | 1.0 | 1.0 |
| ION-EXCHANGED WATER |  | 44 | 76 | 64 | 76 | 44 | 44 | 64 | 76 | 64 | 64 |

FIG. 10

GLOSSY PAPER

| PRINTING MODE | GLOSS UNIFORMITY-ORIENTED MODE | COLOR REPRODUCIBILITY-ORIENTED MODE |
|---|---|---|
| LUT TYPE | FIRST COLOR SEPARATION LUT | SECOND COLOR SEPARATION LUT |
| PRINTING METHOD | CL NORMAL DISCHARGE PRINTING | CL POST-DISCHARGE PRINTING |

FIG. 11A
| INPUT SIGNAL | | | COLOR INK DISCHARGE AMOUNT | | | | CL DISCHARGE AMOUNT |
|---|---|---|---|---|---|---|---|
| R | G | B | C | M | Y | ... | |
| 0 | 0 | 0 | 0 | 0 | 0 | | 20 |
| 0 | 0 | 16 | 15 | 15 | 0 | | 10 |
| 0 | 0 | 32 | 20 | 20 | 0 | | 5 |
| 0 | 0 | 48 | 25 | 25 | 0 | | 0 |
| 0 | 0 | 64 | 30 | 30 | 0 | | 0 |
| 0 | 0 | 80 | 39 | 39 | 0 | | 0 |
| 0 | 0 | 98 | 46 | 46 | 0 | | 10 |
| 0 | 0 | 112 | 53 | 53 | 0 | | 20 |
| ... | ... | ... | ... | ... | ... | ... | ... |
| 0 | 255 | 255 | 0 | 0 | 0 | | 0 |
| 255 | 255 | 255 | 0 | 0 | 0 | | 40 |
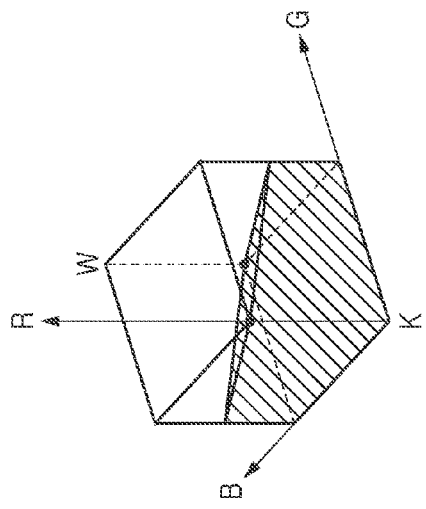
FIG. 11B
FIG. 11C
FIG. 11D

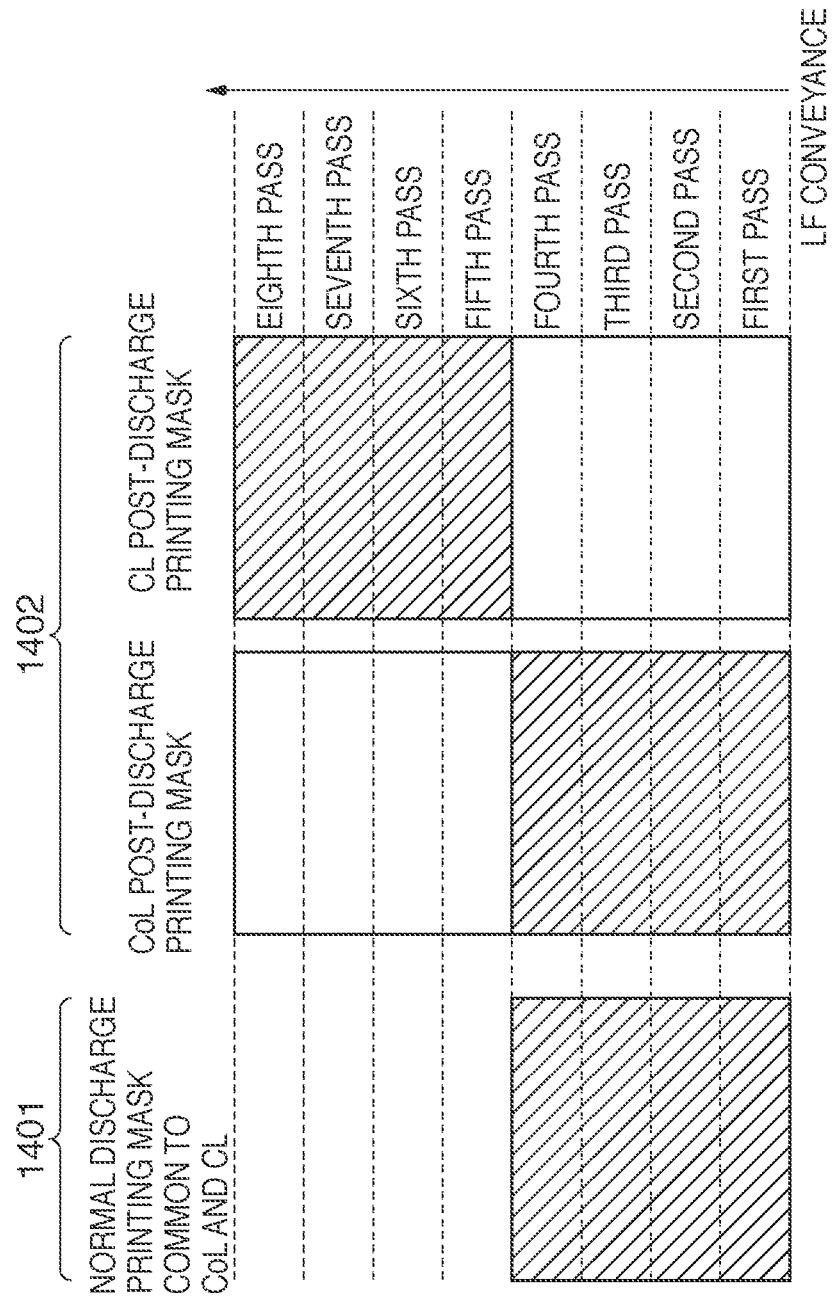

DOTTED LINE : GLOSS UNIFORMITY-ORIENTED MODE
SOLID LINE : COLOR REPRODUCIBILITY-ORIENTED MODE

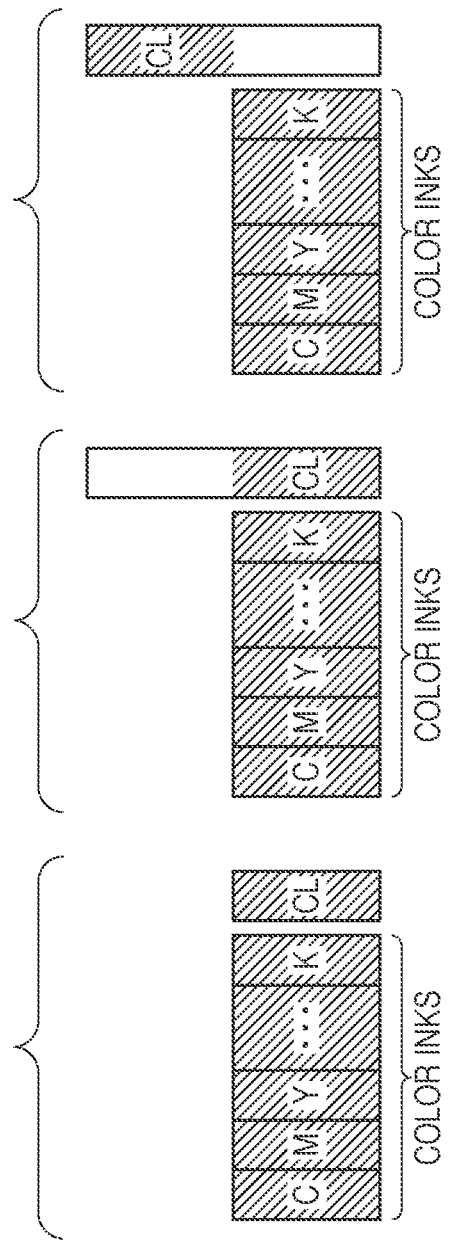

FIG. 17A

| | |
|---|---|
| PAPER TYPE | ○ PLAIN PAPER |
| | ● GLOSSY PAPER |
| | ○ MAT PAPER |
| PRINTING QUALITY | ● FINE |
| | ○ STANDARD |
| | ○ QUICK |
| QUALITY CORRECTION | ● GLOSS UNIFORMITY ORIENTED |
| | ○ COLOR REPRODUCIBILITY ORIENTED |

FIG. 17B

| QUALITY | | QUALITY CORRECTION TYPE | |
|---|---|---|---|
| | | GLOSS UNIFORMITY ORIENTED | COLOR REPRODUCIBILITY ORIENTED |
| QUICK | Col | 8 SCANS | 4 SCANS |
| | CL | 8 SCANS | 4 SCANS |
| STANDARD | Col | 12 SCANS | 8 SCANS |
| | CL | 12 SCANS | 4 SCANS |
| FINE | Col | 16 SCANS | 8 SCANS |
| | CL | 16 SCANS | 8 SCANS |

PRINTING APPARATUS, PRINTING METHOD, AND DATA GENERATING APPARATUS

BACKGROUND OF THE INVENTION

1. Field of the Invention

The present invention relates to a printing apparatus, a printing method for printing an image on a printing medium using color inks of a plurality of colors containing pigments and a colorless ink, and a data generating apparatus.

2. Description of the Related Art

Demand has recently arisen for an inkjet printing apparatus capable of forming an image with high color reproducibility on a glossy printing medium whose surface is glossy. To meet this demand, there is known an inkjet apparatus which adopts a red spot color ink in addition to basic, cyan, magenta, yellow, and black color inks to, for example, widen the color reproductive range.

The need is also high for an inkjet printing apparatus using a pigment ink higher in image fastness than a dye ink. However, most pigment inks hardly permeate into a printing medium. Especially in image formation on a glossy printing medium, the heterogeneity of glossiness readily occurs between the printed and unprinted portions of an image.

To solve this problem of the pigment ink, there is proposed a technique of adjusting the gloss of a printed portion by setting the discharge amount of image quality improvement liquid (colorless ink) based on the color ink amount (see, for example, Japanese Patent No. 3591534). This technique reduces the heterogeneity of glossiness by applying a colorless ink intensively to a region having a small color ink amount when forming an image on a highly glossy printing medium.

However, the present inventors have made studies and found that the technique disclosed in Japanese Patent No. 3591534 has the following problem. That is, when the gloss or surface smoothness of a printed portion changes upon printing with a colorless ink, even the tint seems different. Especially at a dark image portion, applying a colorless ink impairs the surface smoothness and hinders implementation of a wide color reproductive range. When, therefore, forming an image on a glossy printing medium using a pigment ink, the color reproductive range cannot be satisfactorily adjusted by only setting the colorless ink discharge amount based on the color ink amount. The conventional technique cannot fully meet the user demand for an image having a wide color reproductive range over an image having high gloss uniformity.

SUMMARY OF THE INVENTION

An aspect of the present invention is to eliminate the above-mentioned problems with the conventional technology.

The present invention provides a technique capable of forming an image having high gloss uniformity and one having a wide color reproductive range when forming an image using color inks of a plurality of colors containing pigment color materials and a colorless ink.

The present invention in its first aspect provides a printing apparatus which prints an image by scanning a printing head relative to a printing medium, the printing head discharging color inks of a plurality of colors containing pigment color materials and a colorless ink, the apparatus comprising: a color conversion unit configured to convert image data to be printed into ink color data regarding the respective colors of the color inks and the colorless ink; and a printing unit configured to print an image based on the ink color data in a first printing mode in which discharge of the colorless ink to a predetermined area starts before completion of printing with the color inks to the predetermined area, or a second printing mode in which discharge of the colorless ink to the predetermined area starts after completion of printing with the color inks to the predetermined area, wherein the color conversion unit converts the image data into ink color data in the first printing mode and ink color data in the second printing mode to set a discharge amount of the colorless ink in the first printing mode for a dark portion where lightness indicated by the image data becomes smaller than a predetermined value, to be smaller than a discharge amount of the colorless ink set for the dark portion in the second printing mode.

The present invention in its second aspect provides a printing method of printing an image by scanning a printing head relative to a printing medium, the printing head discharging color inks of a plurality of colors containing pigment color materials and a colorless ink, the method comprising: a color conversion step of converting image data to be printed into ink color data regarding the respective colors of the color inks and the colorless ink; and a printing step of printing an image based on the ink color data in a first printing mode in which discharge of the colorless ink to a predetermined area starts before completion of printing with the color inks to the predetermined area, or a second printing mode in which discharge of the colorless ink to the predetermined area starts after completion of printing with the color inks to the predetermined area, wherein in the color conversion step, the image data is converted into ink color data in the first printing mode and ink color data in the second printing mode to set an discharge amount of the colorless ink in the first printing mode for a dark portion where lightness indicated by the image data becomes smaller than a predetermined value, to be smaller than a discharge amount of the colorless ink set for the dark portion in the second printing mode.

The present invention in its third aspect provides a data generating apparatus which generates ink color data, for printing an image with a printing head based on the ink color data in a first printing mode in which discharge of a colorless ink to a predetermined area starts before completion of printing with color inks of a plurality of colors containing pigment color materials to the predetermined area, or a second printing mode in which discharge of the colorless ink to the predetermined area starts after completion of printing with the color inks to the predetermined area, the data generating apparatus comprising: a color conversion unit configured to convert image data to be printed into ink color data regarding the respective colors of the color inks and the colorless ink; wherein the color conversion unit converts the image data into ink color data in the first printing mode and ink color data in the second printing mode to set a discharge amount of the colorless ink in the first printing mode for a dark portion where lightness indicated by the image data becomes smaller than a predetermined value, to be smaller than a discharge amount of the colorless ink set for the dark portion in the second printing mode.

The present invention can form an image having high gloss uniformity and one having a wide color reproductive range when forming an image using color inks of a plurality of colors containing pigment color materials and a colorless ink.

Further features of the present invention will become apparent from the following description of exemplary embodiments with reference to the attached drawings.

BRIEF DESCRIPTION OF THE DRAWINGS

FIG. 5 is a table exemplifying ink components;

FIG. 10 is a table showing details of each printing mode;

FIGS. 11A, 11B, 11C, and 11D are views for explaining the colorless ink discharge amount based on a color separation LUT;

FIG. 12 is a view exemplifying a mask pattern applied to multi-pass printing;

FIGS. 14A and 14B are graphs for explaining the color ink discharge amount;

FIGS. 16A, 16B, and 16C are views exemplifying another arrangement of the printing head; and FIGS. 17A and 17B are views exemplifying a UI for manually setting the printing mode and quality correction.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

The first embodiment controls the gloss and tint of a printed material by controlling both the discharge amount and printing method when an inkjet printing apparatus prints on a glossy printing medium using color inks of a plurality of colors containing pigment color materials and an image quality improvement liquid (to be referred to as a colorless ink).

Glossiness and Image Clarity

Glossiness and image clarity will be explained with reference to FIG. 1 as indices for evaluating the gloss of a printing medium or image in the embodiment.

Figure 1:
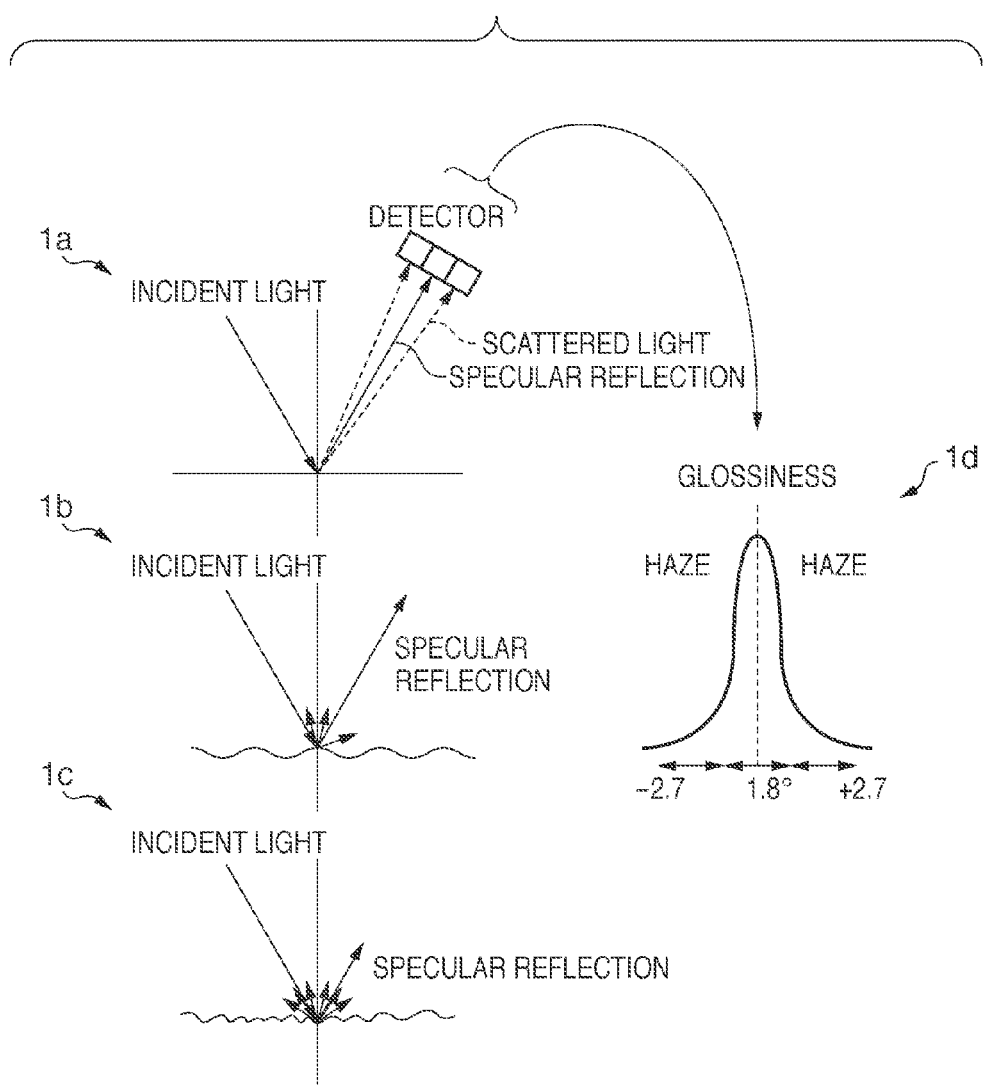
FIG. 1 is a view for explaining the concept of the glossiness.

In FIG. 1, 1a shows an outline of detecting a 20° specular glossiness (to be simply referred to as "glossiness") and haze on the surface of a printed material. As shown in 1a of FIG. 1, a commercially available detector detects light reflected by the surface of a printed material and scattered light, obtaining glossiness and haze values. The reflected light is distributed at a given angle using the axis of specular reflection as the center. As shown in 1d of FIG. 1, the glossiness is detected at, for example, an opening width of 1.8° at the center of the detector. More specifically, when reflection is observed, the reflectance of specular reflection serving as the central axis of the distribution with respect to incident light is defined as glossiness. Assume that the unit of the glossiness in the embodiment is detected in a dimensionless manner, and the value complies with JIS K 5600.

The image clarity is measured using, for example, JIS H 8686 "Test methods for image clarity of anodic oxide coatings on aluminum and aluminum alloy" or JIS K 7105 "Testing methods for optical properties of plastics". The image clarity indicates the sharpness of an image reflected in a printing medium. For example, when an illumination image reflected in a printing medium blurs, the image clarity value becomes small.

In FIGS. 1, 1b and 1c show that the quantity and direction of reflected light change depending on the surface roughness of a printed material. In general, as shown in 1b and 1c of FIG. 1, a rougher surface of a printed material diffuses reflected light much more to decrease the quantity of specular reflection, and the image clarity and glossiness are measured to be smaller. In the embodiment, small variations of image clarity and glossiness values measured at respective points on a printing medium or image will be expressed as high gloss uniformity.

Printing Method and Relationship Between Gloss and Tint

Printing methods for color and colorless inks used in the embodiment, and the relationship between the gloss and tint of a printed image will be explained.

Figure 2A:
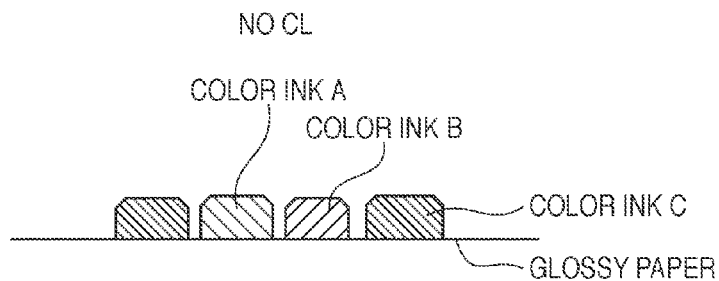
FIGS. 2A, 2B, and 2C are schematic views showing the landing states of color and colorless inks.
Figure 2B:
Figure 2C:

FIGS. 2A to 2C are schematic views showing the landing states of the color and colorless inks in the first embodiment. Changes of the image clarity and glossiness depending on the colorless ink printing method will be explained with reference to FIGS. 2A to 2C. FIG. 2A shows a case in which no colorless ink is applied. FIGS. 2B and 2C show cases in which the colorless ink is applied according to two types of methods to be described later, that is, normal discharge printing and post-discharge printing.

A printing method of starting printing with the colorless ink before completion of printing with the color ink, as shown in FIG. 2B, will be called "normal discharge printing". In general, an ink droplet containing a large amount of color material or polymer which readily remains on the sheet surface tends to inhibit permeation of a droplet applied later. Also, the wetting spread changes depending on paper and the difference in surface tension between ink droplets. In this manner, discharged droplets are different in wetting spread and permeation speed upon landing depending on the type of droplet and the background state. As shown in FIG. 2B, the dot height changes after fixing, impairing the smoothness. As a result, the image clarity and glossiness tend to decrease. This tendency stands out much more as the number of types of color inks used and the amounts of the color and colorless inks increase.

To the contrary, a printing method of starting printing with the colorless ink after completion of printing with the color ink, as shown in FIG. 2C, will be called "post-discharge printing". As shown in FIG. 2C, post-discharge printing maintains (or rather improves) the smoothness of the printed surface. Thus, only the glossiness tends to change greatly in accordance with the colorless ink amount while hardly decreasing the image clarity. That is, the glossiness increases in accordance with the colorless ink amount by applying the colorless ink to a low-glossiness region, but decreases by applying the colorless ink to a high-glossiness region.

As for a white background, the glossiness of a low-glossiness printing medium can be increased by applying a predetermined amount of colorless ink regardless of the printing method (in both normal discharge printing and post-discharge printing).

Figure 3B:
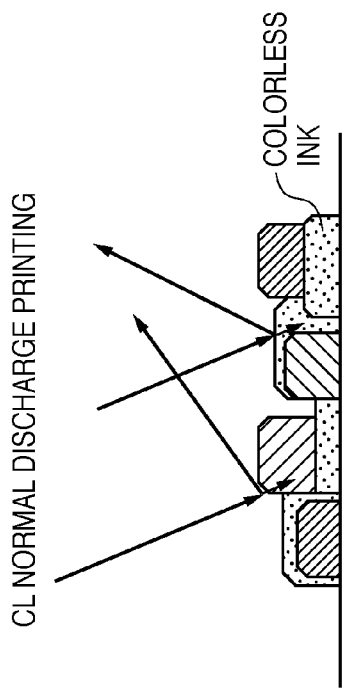
FIGS. 3A, 3B, and 3C are schematic views showing a change of the color reproductive range.
Figure 3C:
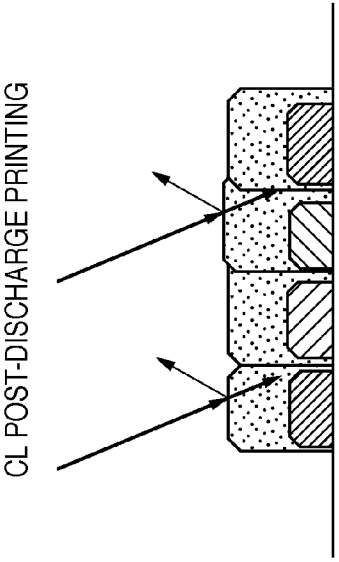
Figure 3A:
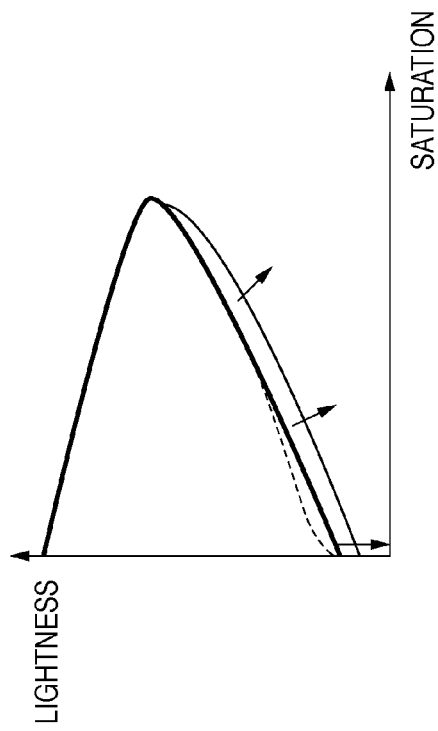

FIGS. 3A to 3C are views for explaining the difference in color reproductive range depending on the difference in colorless ink printing method. FIG. 3A is a graph showing a change of the color reproductive range when the color ink and a predetermined amount of colorless ink are applied by normal discharge printing and post-discharge printing. In particular, FIG. 3A shows the saturation (abscissa) and lightness (ordinate) in cyan hue. Referring to FIG. 3A, the color reproductive range becomes narrower at a dark image portion in normal discharge of the colorless ink with respect to printing with no colorless ink. This is because the smoothness of the printed surface decreases in normal discharge printing, as described above. As shown in FIG. 3B, diffuse reflection readily occurs on the printed surface, and especially a dark portion having a large color ink amount seems to fade. In contrast, when the colorless ink is applied later, the color reproductive range becomes wider at a dark image portion than in printing with no colorless ink. This is because post-discharge printing changes the glossiness of the printed surface while maintaining or improving the smoothness of the printed surface, as described above. Hence, light reflected by the printed surface decreases at a dark portion having a large color ink amount, as shown in FIG. 3C, and a tint with lower lightness can be expressed.

Considering the colorless ink printing method and the relationship between the gloss and the tint as described above, the embodiment adjusts a change of the tint along with printing with the colorless ink by setting the discharge amounts of both the color and colorless inks for each printing method. Note that the tint is color information indicating the hue, lightness, and saturation of an image formed with each color ink. More specifically, the embodiment employs the first and second printing modes as printing methods. In the first printing mode, printing is done to intensively decrease the surface smoothness and glossiness at a color ink printed portion other than a dark portion such as a high-saturation portion. This narrows the gloss difference from the dark portion, increasing the gloss uniformity while maintaining good color reproducibility. In the second printing mode, printing is performed to decrease the gloss without decreasing the surface smoothness at the dark portion, thereby widening the color reproductive range, compared to the first printing mode.

The arrangement of an image forming apparatus, the ink component composition, and image formation processing in the embodiment will be explained in detail.

Apparatus Arrangement

Figure 4A:
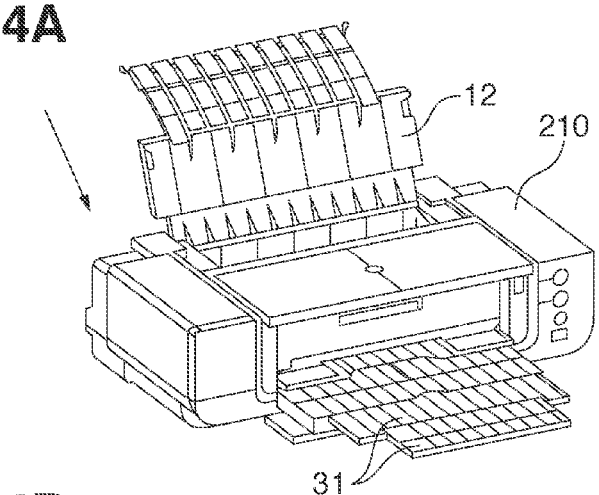
FIGS. 4A, 4B, and 4C are views showing the arrangement of an image forming apparatus.

FIG. 4A is a perspective view showing the outer appearance of an inkjet printing apparatus in the embodiment. A printing medium is inserted from a paper feed tray 12 into an apparatus main body 210 in a direction indicated by an arrow, intermittently conveyed to form an image, and then delivered onto a delivery tray 31.

Figure 4B:
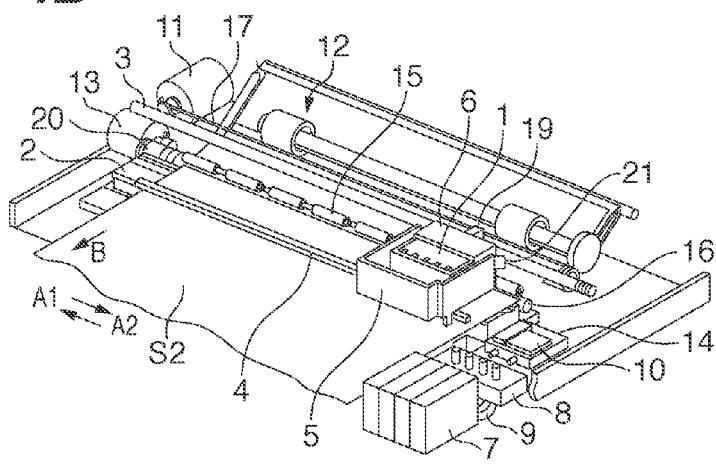

FIG. 4B is a perspective view when the cover of the main body 210 of the inkjet printing apparatus is opened. In FIG. 4B, a printing head 1 mounted on a carriage 5 discharges ink from nozzles while reciprocating along a guide rail 4 in directions indicated by arrows A1 and A2 in FIG. 4B, thereby forming an image on a printing medium S2. The printing head 1 has, for example, a plurality of nozzles corresponding to color inks of different colors and a colorless ink. In the embodiment, the color inks are inks of 10 colors: cyan (C), magenta (M), yellow (Y), black 1 (K1), black 2 (K2), light cyan (LC), light magenta (LM), red (R), green (G), and gray (Gray). That is, the printing head 1 has nozzles for the inks of these 10 colors and a colorless ink (CL). The color inks of these 10 colors and the colorless ink are stored in ink tanks (not shown), and supplied from the ink tanks to the printing head 1. In the embodiment, the ink tanks and printing head 1 are integrated to form a head cartridge 6, and the head cartridge 6 is mounted on the carriage 5.

A timing belt 17 transfers the driving force of a carriage motor 11 to the carriage 5 to reciprocate the carriage 5 along a guide shaft 3 and the guide rail 4 in the directions (main scanning direction) indicated by the arrows A1 and A2 in FIG. 4B. When moving the carriage, an encoder sensor 21 attached to the carriage 5 reads a linear scale 19 arranged in the carriage moving direction, detecting the carriage position. By the reciprocal movement, printing on a printing medium starts. At this time, the printing medium S2 is supplied from the paper feed tray 12, clamped between a conveyance roller 16 and a pinch roller 15, and conveyed to a platen 2.

After the carriage 5 prints by one scanning in the direction A1, a conveyance motor 13 drives the conveyance roller 16 via a linear wheel 20. Then, the printing medium S2 is conveyed by a predetermined amount in a direction indicated by an arrow B serving as the sub-scanning direction. While the carriage 5 scans in the direction A2, printing is done on the printing medium S2. At the home position of the carriage 5, a head cap 10 and recovery unit 14 are arranged to perform recovery processing intermittently for the printing head 1, as needed. By repeating the above operation, printing of one printing medium ends. After that, the printing medium is delivered, completing printing of one printing medium.

Figure 4C:
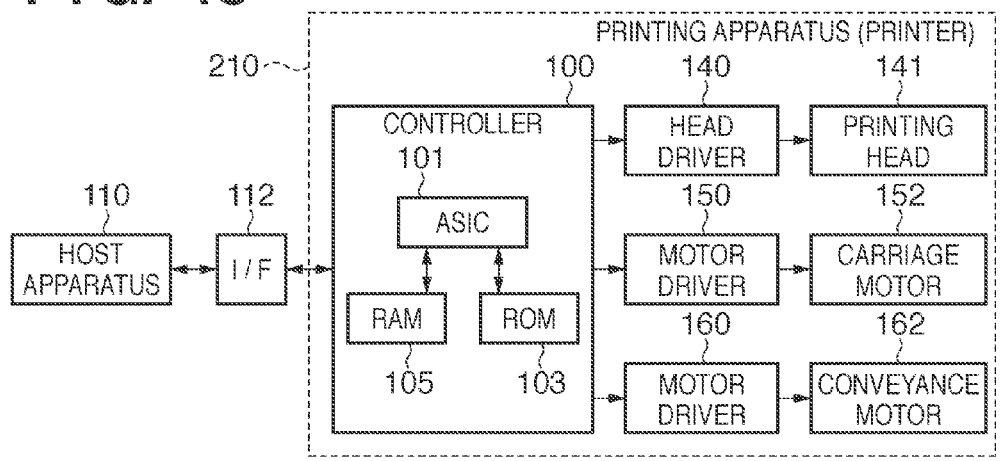

FIG. 4C is a block diagram showing a control arrangement in the inkjet printing apparatus according to the embodiment. A controller 100 is a main control unit, and includes, for example, an ASIC 101, ROM 103, and RAM 105 to configure a microcomputer. The ROM 103 stores a dot layout pattern, mask pattern, and other permanent data. The RAM 105 has an area for rasterizing image data, a work area, and the like. The ASIC 101 executes a series of processes to read out a program from the ROM 103 and print image data on a printing medium.

A head driver 140 drives a printing head 141 (printing head 1 in FIG. 4B) in accordance with print data or the like. A motor driver 150 drives a carriage motor 152 (carriage motor 11 in FIG. 4B). A motor driver 160 drives a conveyance motor 162 (conveyance motor 13 in FIG. 4B).

A host apparatus 110 is an image data supply source to be described later, and may take the form of an image reader or the like in addition to a computer which, for example, generates and processes data such as an image regarding printing. The host apparatus 110 transmits/receives image data, other commands, status signals, and the like to/from the controller 100 via an interface (I/F) 112.

Compositions of Ink and Colorless Ink

The compositions of a color ink (to be simply referred to as an ink) containing a pigment color material and a colorless ink, which are used in the inkjet printing apparatus according to the embodiment, will be explained.

Components (for example, aqueous medium, pigment, dispersant, and surfactant) which compose an ink will be explained.

Aqueous Medium

An ink used in the embodiment preferably uses an aqueous medium containing water and a water-soluble organic solvent. The content (mass %) of the water-soluble organic solvent in the ink is preferably equal to or higher than 3.0 mass % and equal to or lower than 50.0 mass % with respect to the total mass of the ink. The content (mass %) of water in the ink is preferably equal to or higher than 50.0 mass % and equal to or lower than 95.0 mass % with respect to the total mass of the ink. Examples available as the water-soluble organic solvent in the embodiment are as follows. As water, deionized water (ion-exchanged water) is preferably used.

- alkyl alcohols having 1 to 6 carbon atoms such as methanol, ethanol, propanol, propanediol, butanol, butanediol, pentanol, pentanediol, hexanol, and hexanediol
- amides (for example, dimethylformamide and dimethylacetamide)
- ketones or ketoalcohols (for example, acetone and diacetone alcohol)
- ethers (for example, tetrahydrofuran and dioxane)
- polyalkylene glycols having average molecular weights of 200, 300, 400, 600, 1000, and the like (for example, polyethylene glycol and polypropylene glycol)
- alkylene glycols having an alkylene group having 2 to 6 carbon atoms such as ethylene glycol, propylene glycol, butylene glycol, triethylene glycol, 1,2,6-hexantriol, thiodiglycol, hexylene glycol, and diethylene glycol
- lower alkyl ether acetates (for example, polyethylene glycol monomethyl ether acetate)
- glycerin
- lower alkyl ethers of polyalcohols such as ethylene glycol monomethyl (or ethyl)ether, diethylene glycol methyl (or ethyl)ether, and triethylene glycol monomethyl (or ethyl)ether
- N-methyl-2-pyrrolidone, 2-pyrrolidone, 1,3-dimethyl-2-imidazolidinon, and the like

[Pigment]

As the pigment, carbon black or an organic pigment is preferably used. The content (mass %) of the pigment in the ink is preferably equal to or higher than 0.1 mass % and equal to or lower than 15.0 mass % with respect to the total mass of the ink.

The black ink preferably uses, as the pigment, carbon black such as furnace black, lampblack, acetylene black, or channel black. Examples of commercial products available as the black ink in the embodiment are as follows.

- Raven: 7000, 5750, 5250, 5000ULTRA, 3500, 2000, 1500, 1250, 1200, 1190ULTRA-II, 1170, 1255 (all of which are available from Columbia)
- BLACK PEARLS L, REGAL: 330R, 400R, 660R, MOGUL L, MONARCH: 700, 800, 880, 900, 1000, 1100, 1300, 1400, 2000, VULCAN XC-72R (all of which are available from Cabot)
- Color Black: FW1, FW2, FW2V, FW18, FW200, S150, S160, S170, Printex: 35, U, V, 140U, 140V, Special Black: 6, 5, 4A, 4 (all of which are available from Degussa)
- No. 25, No. 33, No. 40, No. 47, No. 52, No. 900, No. 2300, MCF-88, MA600, MA7, MA8, MA100 (all of which are available from Mitsubishi Chemical)

Note that carbon black newly prepared for the embodiment is also available. Needless to say, the present invention is not limited to these examples, and can adopt any conventional carbon black. The black ink is not limited to the carbon black, and may use, as the pigment, a magnetic fine particle (for example, magnetite or ferrite), titanium black, or the like.

Examples available as the organic pigment in the embodiment are as follows. However, the present invention is not limited to them.

- water-insoluble azo pigments such as toluidine red, toluidine maroon, Hansa yellow, benzidine yellow, and pyrazolone red
- water-soluble azo pigments such as lithol red, helio bordeaux, pigment scarlet, and permanent red 2B
- derivatives from vat dyes such as alizarin, indanthrone, and thioindigo maroon
- phthalocyanine-based pigments such as phthalocyanine blue and phthalocyanine green
- quinacridone-based pigments such as quinacridone red and quinacridone magenta
- perylene-based pigments such as perylene red and perylene scarlet
- isoindolinone-based pigments such as isoindolinone yellow and isoindolinone orange
- imidazolone-based pigments such as benzimidazolone yellow, benzimidazolone orange, and benzimidazolone red
- pyran-throne-based pigments such as pyran-throne red and pyran-throne orange
- indigo-based pigments, condensed azo-based pigments, thioindigo-based pigments, diketopyrrolopyrrole-based pigments
- flavanthrone yellow, acylamide yellow, quinophtalone yellow, nickel azo yellow, copper azomethine yellow, perinone orange, anthrone orange, dianthraquinonyl red, and dioxazine violet When an organic pigment is indicated by a color index (C.I.) number, the follow pigments are available. Needless to say, the present invention is not limited to them.

- C.I. pigment yellow: 12, 13, 14, 17, 20, 24, 74, 83, 86, 93, 97, 109, 110, 117, 120, 125, 128, 137, 138, 147, 148, 150, 151, 153, 154, 166, 168, 180, 185, and the like
- C.I. pigment orange: 16, 36, 43, 51, 55, 59, 61, 71, and the like
- C.I. pigment red: 9, 48, 49, 52, 53, 57, 97, 122, 123, 149, 168, 175, 176, 177, 180, 192, 215, 216, 217, 220, 223, 224, 226, 227, 228, 238, 240, 254, 255, 272, and the like
- C.I. pigment violet: 19, 23, 29, 30, 37, 40, 50, and the like
- C.I. pigment blue: 15, 15:1, 15:3, 15:4, 15:6, 22, 60, 64, and the like
- C.I. pigment green: 7, 36, and the like
- C.I. pigment brown: 23, 25, 26, and the like

[Dispersant]

As the dispersant for dispersing the above-mentioned pigment in an aqueous medium, any water-soluble resin is available, but preferable examples are those having a weight-average molecular weight of 1,000 (inclusive) to 30,000 (inclusive), and more preferably, 3,000 (inclusive) to 15,000 (inclusive). The content (mass %) of the dispersant in the ink is preferably equal to or higher than 0.1 mass % and equal to or lower than 5.0 mass % with respect to the total mass of the ink.

Examples of the dispersant in the embodiment are as follows:

- styrene, vinylnaphthalene, aliphatic alcohol esters of $\alpha,\beta$-ethylenically unsaturated carboxylic acids, acrylic acid, maleic acid, itaconic acid, fumaric acid, vinyl acetate, vinyl pyrrolidone, acrylamide, and polymers containing derivatives of them as monomers
- natural resins such as rosin, shellac, and starch Note that one or more monomers which compose a polymer are preferably hydrophilic monomers, and a block copolymer, random copolymer, graft copolymer, or salts of them may also be used. The resin is preferably soluble in a base-dissolved aqueous solution, that is, is alkali soluble resin.

[Surfactant]

To adjust the surface tension of an ink which forms an ink set, surfactants such as an anionic surfactant, nonionic surfactant, and ampholytic surfactant are preferably used. Examples are polyoxyethylene alkyl ether, polyoxyethylene alkyl phenols, acetylene glycol compounds, and acetylene glycol ethylene oxide adducts.

[Other Components]

In addition to the above components, an ink which forms an ink set may contain a moisturizing solid content such as urea, urea derivatives, trimethylol propane, or trimethylol ethane for moisture retention. The content (mass %) of the moisturizing solid content in the ink is preferably equal to or higher than 0.1 mass % and equal to or lower than 20.0 mass %, and more preferably equal to or higher than 3.0 mass % and equal to or lower than 10.0 mass % with respect to the total mass of the ink. In addition to the above components, an ink which forms an ink set may contain various additives such as a pH adjustor, anti-corrosive agent, preservative, mildewproofing agent, antioxidant, anti-reduction agent, and evaporation accelerator, as needed.

[Preparation of Ink]

Preparation of an ink used in the embodiment will be explained in more detail. However, the present invention is not limited to the following example without departing from the gist of the invention. In the following description, "part" and "%" are mass criteria, unless otherwise specified.

In the embodiment, pigment dispersions 1 to 6 were prepared by the following procedures. In the following description, the dispersant is an aqueous solution obtained by neutralizing a styrene-acrylic acid copolymer having an acid number of 200 and a weight-average molecular weight of 10,000 by a 10-mass % aqueous sodium hydroxide solution.

Preparation of Pigment Dispersion 1 Containing C.I. Pigment Red 122

First, 10 parts of a pigment (C.I. pigment red 122), 20 parts of a dispersant, and 70 parts of ion-exchanged water were mixed and dispersed for 3 h using a batch vertical sand mill. Then, coarse particles were removed by centrifugal processing. Further, the pigment dispersion was filtrated under pressure through a cellulose acetate filter (available from ADVANTEC) having a pore size of 3.0 μm, obtaining pigment dispersion 1 having a pigment concentration of 10 mass %.

Preparation of Pigment Dispersion 2 Containing C.I. Pigment Blue 15:3

First, 10 parts of a pigment (C.I. pigment blue 15:3), 20 parts of a dispersant, and 70 parts of ion-exchanged water were mixed and dispersed for 5 h using a batch vertical sand mill. Then, coarse particles were removed by centrifugal processing. Further, the pigment dispersion was filtrated under pressure through a cellulose acetate filter having a pore size of 3.0 μm, obtaining pigment dispersion 2 having a pigment concentration of 10 mass %.

Preparation of Pigment Dispersion 3 Containing C.I. Pigment Yellow 74

First, 10 parts of a pigment (C.I. pigment yellow 74), 20 parts of a dispersant, and 70 parts of ion-exchanged water were mixed and dispersed for 1 h using a batch vertical sand mill. Then, coarse particles were removed by centrifugal processing. Further, the pigment dispersion was filtrated under pressure through a cellulose acetate filter having a pore size of 3.0 μm, obtaining pigment dispersion 3 having a pigment concentration of 10 mass %.

Preparation of Pigment Dispersion 4 Containing C.I. Pigment Black 7

First, 10 parts of a carbon black pigment (C.I. pigment black 7), 20 parts of a dispersant, and 70 parts of ion-exchanged water were mixed and dispersed for 3 h using a batch vertical sand mill. Note that the peripheral speed in dispersion was double the peripheral speed used to prepare pigment dispersion 1. Then, coarse particles were removed by centrifugal processing. Further, the pigment dispersion was filtrated under pressure through a cellulose acetate filter having a pore size of 3.0 μm, obtaining pigment dispersion 4 having a pigment concentration of 10 mass %.

Preparation of Pigment Dispersion 5 Containing C.I. Pigment Red 149

First, 10 parts of a pigment (C.I. pigment red 149), 20 parts of a dispersant, and 70 parts of ion-exchanged water were mixed and dispersed for 3 h using a batch vertical sand mill. Then, coarse particles were removed by centrifugal processing. Further, the pigment dispersion was filtrated under pressure through a cellulose acetate filter having a pore size of 3.0 μm, obtaining pigment dispersion 5 having a pigment concentration of 10 mass %.

Preparation of Pigment Dispersion 6 Containing C.I. Pigment Green 7

First, 10 parts of a pigment (C.I. pigment green 7), 20 parts of a dispersant, and 70 parts of ion-exchanged water were mixed and dispersed for 3 h using a batch vertical sand mill. Then, coarse particles were removed by centrifugal processing. Further, the pigment dispersion was filtrated under pressure through a cellulose acetate filter having a pore size of 3.0 μm, obtaining pigment dispersion 6 having a pigment concentration of 10 mass %.

As color inks in the embodiment, inks 1 to 10 shown in FIG. 5 are prepared. More specifically, components shown in FIG. 5 are mixed using pigment dispersions 1 to 6 prepared in the above way, and stirred well. After that, the resultant liquids are filtrated under pressure through a cellulose acetate filter having a pore size of 0.8 μm, obtaining inks 1 to 10.

[Preparation of Colorless Ink]

The embodiment uses the colorless ink as an image quality improvement liquid to improve at least the gloss uniformity and gamut. As long as the same effects are obtained, the composition of the colorless ink is not limited to the embodiment. Preparation of the colorless ink used in the embodiment will be explained in detail.

As the colorless ink in the embodiment, the following liquid compositions are prepared using a styrene (St)-acrylic acid (AA) copolymer A synthesized by solution polymerization using a free-radical initiator. Note that the styrene-acrylic acid copolymer A has St/AA=70/30 (mass %), a molecular weight of 10,500, and a measured acid number of 203. The basic substance is potassium hydroxide, and the content of the additive is adjusted to set the pH of the liquid composition to 8.0.

| | |
|---|---|
| styrene-acrylic acid copolymer A | 2 parts |
| glycerin | 7 parts |
| diethylene glycol | 5 parts |
| water | 86 parts |

Image Formation Processing

Figure 6:
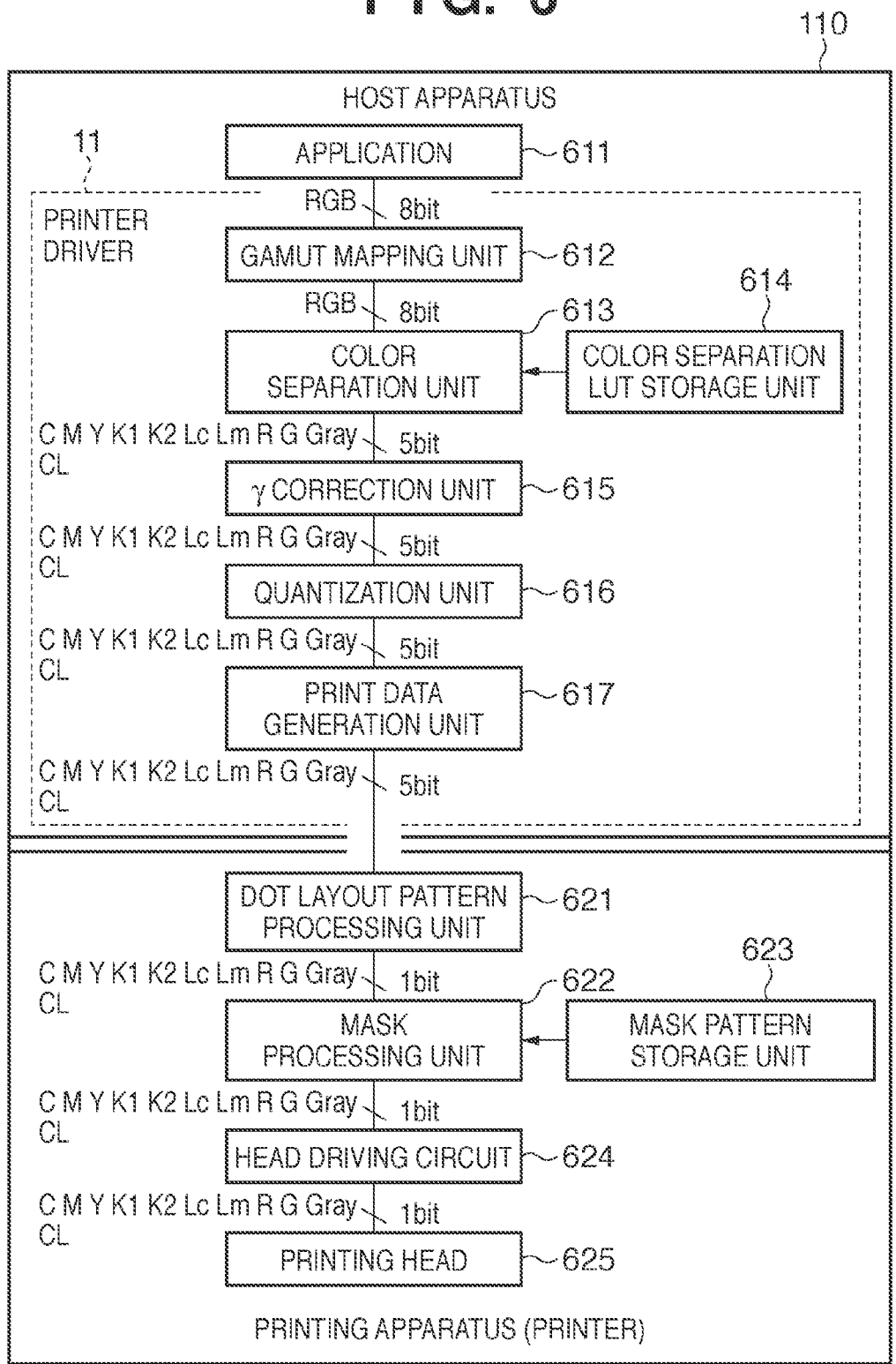
FIG. 6 is a block diagram showing an arrangement which performs image formation processing.

Image formation processing in the embodiment will be described. FIG. 6 is a block diagram showing an arrangement which performs image formation processing in a printing system according to the embodiment. FIG. 6 shows a state in which image data that is input as an image formation target and represented by 8 bits (256 tone levels) for each of R, G, and B is converted into 1-bit data for each ink color.

As described above, the printing system in the embodiment is configured by the host apparatus 110 and the inkjet printing apparatus (to be simply referred to as a printer) 210. The host apparatus 110 is, for example, a personal computer (PC), and includes an application 611 and a printer driver 11 corresponding to the inkjet printing apparatus.

The application 611 executes processing of generating image data to be transferred to the printer driver 11 (to be described later) based on information designated by the user via a UI screen on the monitor of the host apparatus 110, and processing of setting printing control information for controlling printing.

Figure 7:
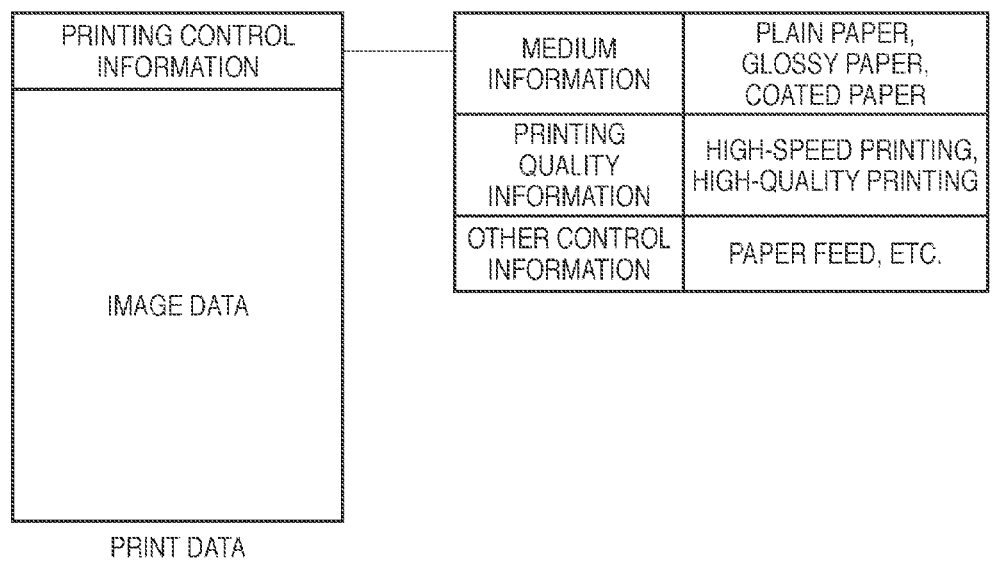
FIG. 7 is a view exemplifying the structure of print data to be printed.

FIG. 7 exemplifies the structure of print data to be printed in the embodiment. As shown in FIG. 7, the print data is formed from the above-mentioned image data and printing control information. The printing control information includes "medium information", "printing quality information", and "other control information" such as the paper feed method. The medium information describes the type of printing medium used for printing, and defines any one type of printing medium out of plain paper, glossy paper, postcard, printable disk, and the like. The printing quality information describes the printing quality, and defines any one type of printing quality out of "fine", "standard", "quick", and the like. In the embodiment, either of two printing modes "gloss uniformity-oriented mode" and "color reproducibility-oriented mode" (to be described later) can be set based on a user interface (UI) as shown in FIG. 17A. The "other control information" shown in FIG. 7 includes this printing mode information. The image data and printing control information processed by the application 611 are transferred to the printer driver 11 in printing.

The printer driver 11 includes a gamut mapping unit 612, color separation unit 613, γ correction unit 615, quantization unit 616, and print data generation unit 617. Processing in each unit will be described briefly.

The gamut mapping unit 612 maps the gamut. This processing executes data conversion to map a gamut reproduced by sRGB image data (R, G, and B) into a gamut reproduced by the printer 210. More specifically, the gamut mapping unit 612 converts data of 256 tone levels in which each of R, G, and B is expressed by 8 bits, into R, G, and B data (R, G, and B values) each of 8 bits having different gamuts by using a 3D lookup table (LUT: not shown). This conversion is performed using interpolation calculation in addition to the 3D LUT.

Based on a color separation 3D LUT, the color separation unit 613 converts R, G, and B data mapped in the gamut into ink color data each of 8 bits serving as a combination of color inks and a colorless ink which reproduce a color represented by the data. That is, in the embodiment, the color separation unit 613 functions as a color conversion unit which converts R, G, and B data into C, M, Y, K1, K2, LC, LM, R, G, Gray, and CL data corresponding to color inks of the 10 colors and a colorless ink. This conversion is done using interpolation calculation in addition to the 3D LUT. A plurality of color separation 3D LUTs are held in a color separation LUT storage unit 614, and an appropriate one of them is selected based on printing control information.

The γ correction unit 615 converts the density value (tone value) of ink color data obtained by the color separation unit 613 for each color. More specifically, the γ correction unit 615 performs conversion using a 1D LUT to make ink color data linearly correspond to the tone characteristic of the printer 210.

The quantization unit 616 performs quantization processing to convert each ink color data of 8 bits for each color having undergone γ correction into 5-bit data. In the embodiment, the quantization unit 616 converts 8-bit data for 256 tone levels into 5-bit data for 17 tone levels using an error diffusion method. The 5-bit data obtained here serves as an index indicating a dot layout pattern in dot layout pattern processing (to be described later) in the printer 210. Note that the data quantized into 17 tone levels for each color is tone value information indicating one of levels 0 to 16.

The print data generation unit 617 generates print data as shown in FIG. 7 from the printing control information and the 5-bit printing image data generated by the quantization unit 616. The generated print data is supplied to the printer 210.

Figure 8:
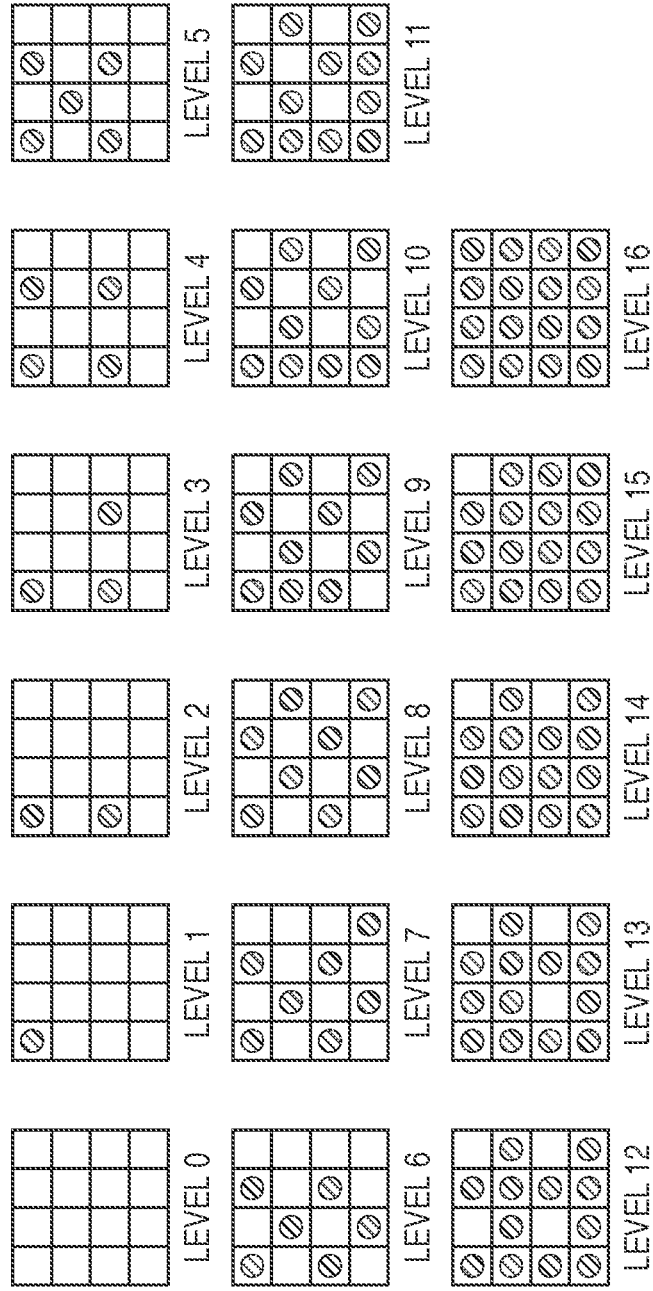
FIG. 8 is a view exemplifying a dot layout pattern.

When the host apparatus 110 sends the print data to the printer 210 in this manner, a dot layout pattern processing unit 621 performs binarization processing for the input print data in the printer 210. More specifically, the dot layout pattern processing unit 621 converts the input 17-tone value information into a dot layout pattern, obtaining binary data indicating whether to discharge ink from the printer 210. FIG. 8 shows dot layout patterns for 17 tone levels used in the embodiment. In the dot layout pattern shown in FIG. 8, a filled area represents a pixel where a dot is to be printed, and a blank area represents a pixel where no dot is to be printed. The dot layout pattern processing unit 621 expands the index of each pixel expressed by 5-bit data corresponding to one of tone levels 0 to 16 as an output value from the quantization unit 616 into a dot layout pattern corresponding to the tone value (one of levels 0 to 16). As a result, whether or not to print (discharge) an ink dot is defined for a plurality of regions in a corresponding dot layout pattern for one multilevel pixel. That is, the resolution of input data of one multilevel pixel (5 bits) is converted for a unit region of 4×4 binary pixels, and binary data of 1 bit "1" or "0" is arranged for each pixel.

By using a plurality of mask patterns complementary to each other, a mask processing unit 622 adds printing scan timing information to the dot layout of each color that is determined by the dot layout pattern processing unit 621. More specifically, the mask processing unit 622 generates printing data of each printing pass in multi-pass printing by mask processing (to be described later) for each of C, M, Y, K1, K2, LC, LM, R, G, Gray, and CL colors. Note that a plurality of mask patterns are stored in a mask pattern storage unit 623 and selected based on printing control information. When completing an image by one scanning, mask processing is omitted.

Printing data after mask processing is supplied to a head driving circuit 624 at a timing appropriate for a plurality of printing passes in multi-pass printing. The printing data input to the head driving circuit 624 is converted into a driving pulse for a printing head 625 (printing head 1 in FIG. 4B). The printing head 625 for each color discharges an ink at a predetermined timing. Accordingly, the ink is discharged in accordance with printing data, printing an image on a printing medium.

Figure 9:
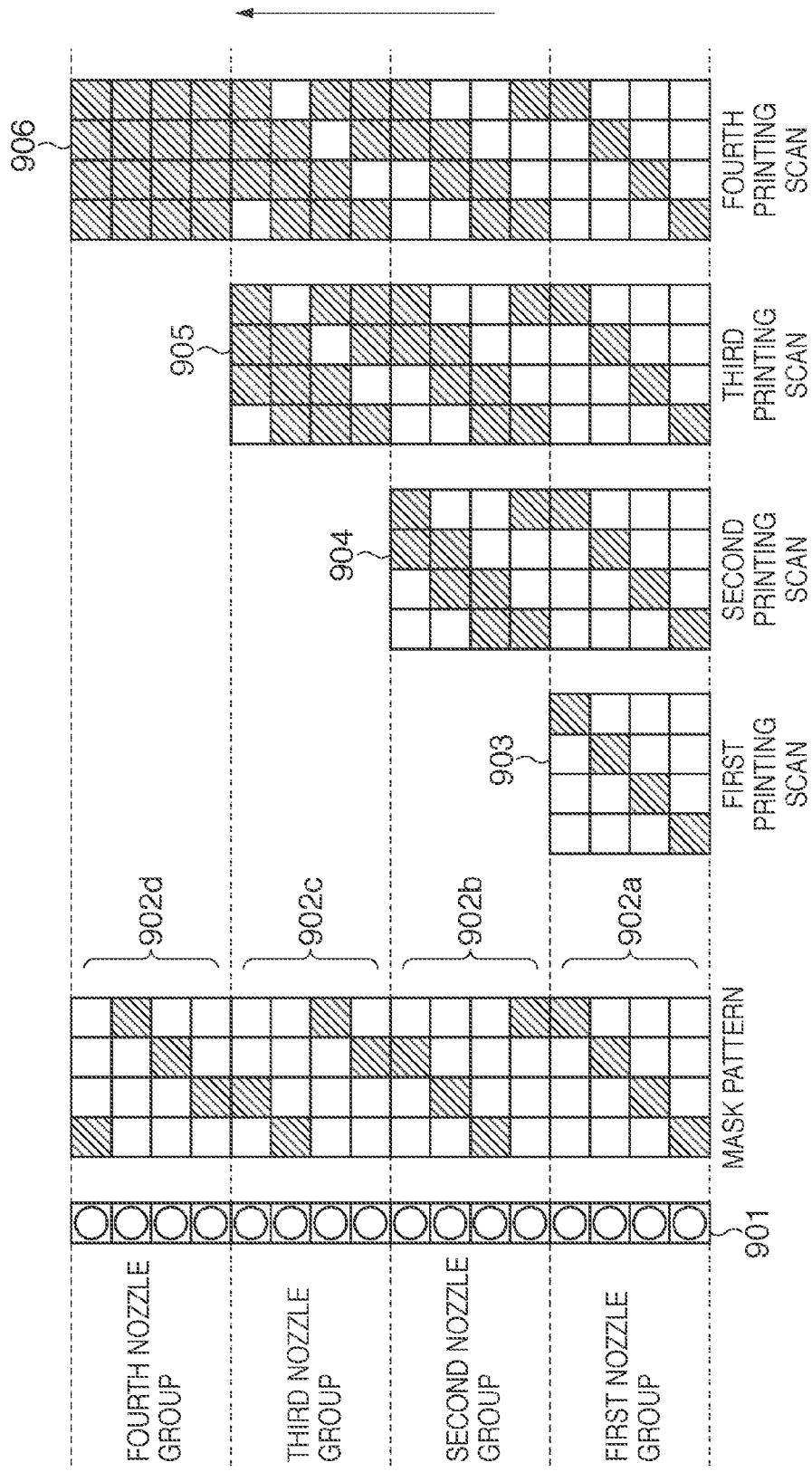
FIG. 9 is a schematic view showing multi-pass printing.

Multi-pass printing in the embodiment will be explained. Multi-pass printing is a method of printing an image by scanning a unit region on a printing medium by the printing head a plurality of number of times. FIG. 9 schematically shows a state in which multi-pass printing is performed. The printing head 1 applied to the embodiment has 768 nozzles in practice. However, for simplicity, assume that the printing head 1 has 16 nozzle 901, and an image is formed by four printing scans. The nozzles 901 are divided into the first to fourth nozzle groups, and each nozzle group includes four nozzles. In multi-pass printing, the unit region is printed by a plurality of scans. A mask pattern is known as a division pattern for dividing image data to be printed into a plurality of data. A mask 902 is formed from first to fourth mask patterns 902a to 902d, which define printing-permitted pixels for the first to fourth nozzle groups, respectively. In each mask pattern, a solid area represents a printing-permitted pixel where printing of a dot is permitted, and a blank area represents a non-printing area where printing of a dot is inhibited. The first to fourth mask patterns 902a to 902d are complementary to each other. By superposing these four mask patterns, printing of a region corresponding to 4×4 pixels=16 pixels is completed. Patterns 903 to 906 show states in which an image is completed by repeating the printing scan. Every time the printing scan ends, the printing medium is intermittently conveyed by the width (corresponding to four nozzles in FIG. 9) of the nozzle group) in a direction indicated by an arrow in FIG. 9. Hence, an image is completed by four printing scans in the same printing region (region corresponding to the width of each nozzle group) on the printing medium. AND processing is executed using the mask patterns and binary image data obtained by the above-described dot layout pattern processing, determining binary printing data to be printed in each printing pass.

Printing Mode

In the embodiment, the above-described image forming processing is performed in accordance with printing control information. The printing mode, which is as a feature of the embodiment, will be described in detail.

As described with reference to FIGS. 2A to 2C and FIGS. 3A to 3C, applying a colorless ink in image formation changes the gloss and color reproductive range of an image. The embodiment adjusts the gloss and color reproductive range on a printed material by controlling the discharge amounts of the color and colorless inks and the printing method. The first printing mode for implementing high gloss uniformity will be called a "gloss uniformity-oriented mode", and the second printing mode for implementing a wide color reproductive range will be called a "color reproducibility-oriented mode".

In the embodiment, the discharge amounts of the color inks and that of the colorless ink are determined based on a color separation table looked up by the color separation unit 613. FIG. 10 exemplifies combinations of color separation tables set in respective printing modes and printing methods for the colorless ink (to be referred to as CL). Referring to FIG. 10, in the gloss uniformity-oriented mode, CL normal discharge printing is done by looking up the first color separation table created for the first printing mode. In the color reproducibility-oriented mode, CL post-discharge printing is performed by looking up the second color separation table created for the second printing mode. The first and second color separation tables will be called the first and second LUTs.

The color separation table in the embodiment will be described with reference to FIGS. 11A to 11D. FIG. 11A exemplifies a color separation table looked up by the color separation unit 613. In the color separation table, the discharge amount values of corresponding color inks and that of the colorless ink are assigned as ink color data for each grid point given by R, G, and B values corresponding to 256 tone levels reproduced by the printer 210. The R, G, and B values correspond to information about the lightness, saturation, and hue. (R, G, B)=(0, 0, 0) represents black (K) corresponding to the lowest lightness, and (R, G, B)=(255, 255, 255) represents white (W) corresponding to the highest lightness. FIG. 11B is a conceptual view showing an input RGB color space range in the color separation table. In the embodiment, the colorless ink discharge amount at a low-lightness dark image portion (hatched range in FIG. 11B) is set smaller in the gloss uniformity-oriented mode than in the color reproducibility-oriented mode. In the gloss uniformity-oriented mode in which the colorless ink is normally applied, the colorless ink discharge amount at a dark portion decreases, so a decrease in surface smoothness at the dark portion and a decrease in glossiness can be suppressed.

FIG. 11C shows the relationship between an input signal and the colorless ink discharge amount (CL), which is set in the first LUT for the gloss uniformity-oriented mode according to the embodiment.

In FIG. 11C, the abscissa indicates the input signal, and exemplifies a cyan line which changes from lowest-lightness black (R, G, B)=(0, 0, 0) to highest-lightness white (R, G, B)=(255, 255, 255) through high-saturation cyan (R, G, B)= (0, 255, 255). Referring to FIG. 11C, CL decreases toward high-saturation cyan (C primary) from white (white background) at which the CL discharge amount maximizes in the entire cyan line. CL is equal to or smaller than A at the dark portion from high-saturation cyan (C primary) to black (darkest portion). Note that A is a CL discharge amount reference value which is determined based on the glossiness of an image formed with the color and colorless inks. For example, a CL amount at which the glossiness of the printed surface does not decrease even upon printing with only CL is set as A. If the glossiness is low enough without applying the colorless ink, A=0 may be set.

FIG. 11D shows the colorless ink discharge amount (CL) with respect to the cyan line, which is set in the second LUT for the color reproducibility-oriented mode according to the embodiment. Referring to FIG. 11D, CL decreases from the white background toward the C primary, but becomes larger than A from the C primary toward the darkest portion. That is, the CL amount at the dark portion (from the C primary to the darkest portion) becomes smaller in the gloss uniformity-oriented mode shown in FIG. 11C than in the color reproducibility-oriented mode shown in FIG. 11D. Thus, in the gloss uniformity-oriented mode in which CL normal discharge printing is performed, a decrease in surface smoothness at the dark portion and a decrease in glossiness are suppressed.

Note that the embodiment defines, as the dark image portion, a low-lightness region which occupies half of the entire range of the input RGB color space, as shown in FIGS. 11B, 11C, and 11D. More specifically, the entire range of the input RGB color space is divided into two regions along a plane passing through two points (R, G, B)=(255, 0, 0) and (0, 255, 255), and a region on the side of black (R, G, B)=(0, 0, 0) out of the two regions is defined as the low-lightness region. For example, for the cyan line, a region from the highest saturation (C primary) at an intermediate point to the darkest portion is represented as the dark portion in the entire range (R, G, B)=(0, 0, 0) to (0, 255, 255) to (255, 255, 255). However, the definition of the dark portion in the present invention is not limited to this example, and the dark portion may be a portion at which the lightness indicated by an input signal becomes equal to or lower than a predetermined value, or a portion at which the color ink discharge amount becomes equal to or larger than a predetermined value in image formation. More specifically, a portion at which the lightness indicated by an input signal becomes equal to or lower than 40 is desirably set as the dark portion. In this embodiment, a lightness is measured by using a colorimeter, such as "Spectrolino" (registered trademark) which is manufactured by GretagMacbeth. The colorimeter is an apparatus to output a colorimetric value, such as L*a*b* which is color value, by acquiring a spectral reflectance of a printing medium by detecting a reflected light. The reflected light is produced by irradiating the printing medium with a light source which spectral reflectance is known.

Multi-pass printing in each colorless ink printing mode according to the embodiment will be described with reference to FIG. 12. In a printing example 1401, a mask pattern common to the color and colorless inks is applied in normal discharge printing in the gloss uniformity-oriented mode.

Printing starts using both the color and colorless inks from the first scanning, and is completed by four printing scans. In normal discharge printing, it suffices to start printing with the colorless ink before completion of printing with the color ink. For example, it is also possible to apply the color ink from the first to fourth scans, and the colorless ink from the third to sixth scans. In a printing example 1402, mask patterns specific to the color and colorless inks are applied in post-discharge printing in the color reproducibility-oriented mode. In this case, printing with the color ink is completed by four printing scans (first to fourth passes), and then printing with the colorless ink is completed by four printing scans (fifth to eighth passes). That is, a total of eight printing scans are performed in post-discharge printing. As is apparent from this, an image can be formed more quickly in the gloss uniformity-oriented mode in which image formation in the same region is completed by four printing scans, than in the color reproducibility-oriented mode in which it is completed by eight printing scans.

Image Formation Results

As described above, the embodiment can control the gloss and tint of a formed image by performing image formation using a color separation table and printing method (normal discharge printing/post-discharge printing) corresponding to a designated printing mode. Control of the gloss and tint when an image is actually formed in each printing mode will be exemplified with reference to FIGS. 13A to 13C. Assume that the maximum color ink discharge amount (total applicable amount) is equal between the printing modes.

Figure 13A:
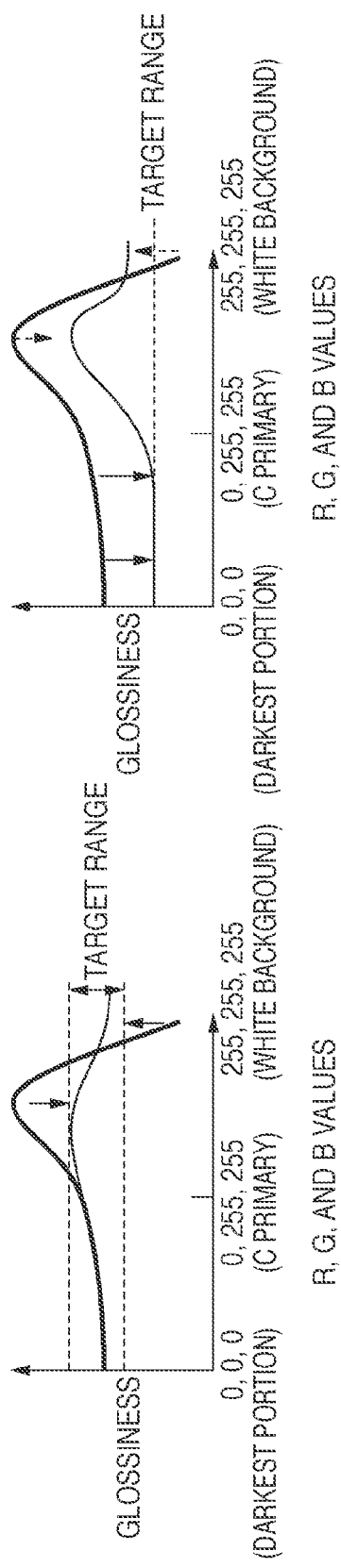
FIGS. 13A, 13B, and 13C are graphs exemplifying control of the gloss and tint in each printing mode.

FIG. 13A is a graph showing the glossiness (gloss characteristic) of the cyan line that is obtained when an image is formed in the gloss uniformity-oriented mode. In FIG. 13A, the thin line indicates a gloss characteristic obtained when an image is formed in the gloss uniformity-oriented mode of the embodiment, that is, an image is formed by CL normal discharge printing using the first LUT shown in FIG. 11C. The thick line indicates a gloss characteristic obtained when normal printing is performed without using the colorless ink. Referring to FIG. 13A, while suppressing a decrease in glossiness at the dark portion, the glossiness is decreased by CL normal discharge in a range from the white background to the C primary, and the glossiness of the printing medium itself is increased by applying CL in the white background. Hence, the glossiness from the white background to halftone can be controlled to fall within a predetermined target glossiness range, improving the gloss uniformity. Although FIG. 13A exemplifies the cyan line, a combination of the color inks can be optimized to implement satisfactory color reproduction while maintaining the gloss uniformity. In this case, CL is applied to the white background, but may not be applied to the white background because almost no white background is generated in photo printing in which CL is applied.

Figure 13B:
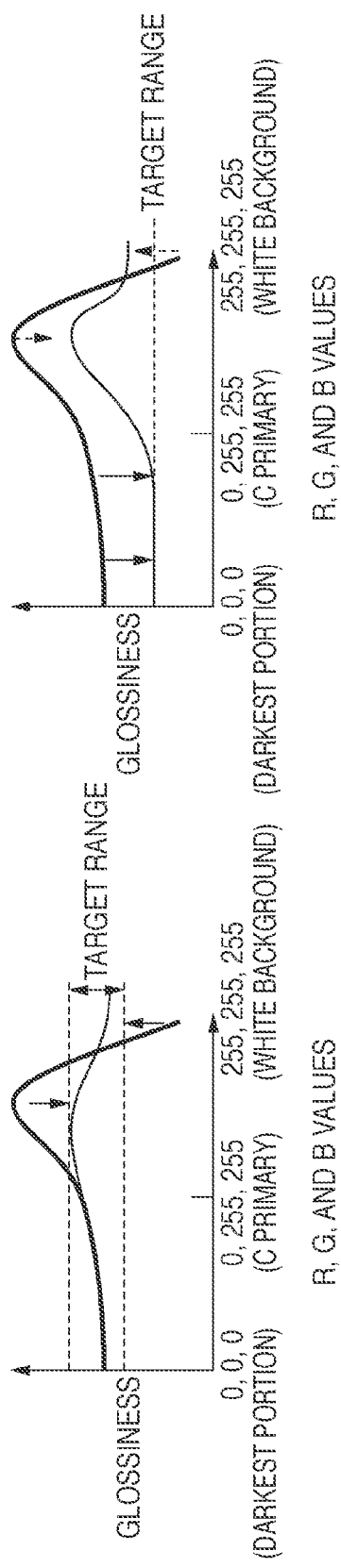
Figure 13C:
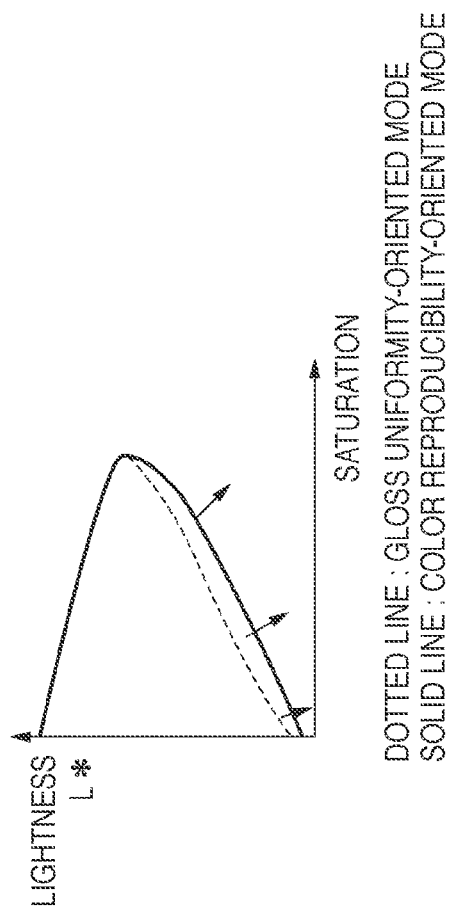

To the contrary, in the color reproducibility-oriented mode, the colorless ink can be applied later to decrease light reflected by the printed surface at the dark portion and express a lower-lightness tint. Image printing with a wide color reproductive region can be implemented as shown in FIG. 13C. Also in this mode, the glossiness can be uniformed from the white background to the dark portion though the gloss uniformity is not so high, unlike the gloss uniformity-oriented mode. FIG. 13B is a graph showing the glossiness (gloss characteristic) of the cyan line that is obtained when an image is formed in the color reproducibility-oriented mode. In FIG. 13B, the thin line indicates a gloss characteristic obtained when an image is formed in the color reproducibility-oriented mode of the embodiment, that is, an image is formed by CL post-discharge printing using the second LUT shown in FIG. 11D. The thick line indicates a gloss characteristic obtained when normal printing is performed without using the colorless ink. Referring to FIG. 13B, CL is applied by an amount exceeding the reference value A even at the dark portion, decreasing the glossiness while maintaining the surface smoothness in the entire range of the color portion (color ink printed portion) other than the white background. In the white background, the glossiness of the printing medium itself is increased by applying CL, as described above. Even in the color reproducibility-oriented mode, the glossiness is uniformed.

As described above, according to the embodiment, both the discharge amount and printing method are controlled when printing with color inks of a plurality of colors containing pigment color materials and a colorless ink. As a result, both an image having high gloss uniformity and one having a wide color reproductive range can be printed on the same printing medium. More specifically, in the gloss uniformity-oriented mode, normal discharge printing is done by setting the colorless ink discharge amount to be equal to or smaller than the reference value A at a dark image portion, thereby enabling quick printing while improving the gloss uniformity. In the color reproducibility-oriented mode, post-discharge printing is performed by setting the colorless ink discharge amount to be larger than A at a dark image portion, thereby widening the color reproductive range.

<Modification>

A modification to the first embodiment will be described.

CL Printing Scan Count

The first embodiment has described an example in which printing with the colorless ink is completed by four printing scans in post-discharge printing in the color reproducibility-oriented mode, as described with reference to FIG. 12. However, post-discharge printing in the present invention suffices to widen the color reproductive range by decreasing the gloss while maintaining the image clarity of the surface of a printed material. Thus, the printing scan count in the present invention is not limited to this. For example, it is also possible to complete printing with the colorless ink in post-discharge printing by two scans, that is, complete printing with the color ink by four scans and then complete printing with the colorless ink by two scans. In this way, the printing scan count of the colorless ink is set smaller than that of the color ink in the color reproducibility-oriented mode, widening the color reproductive range while increasing the throughput in image formation. As a matter of course, even the printing scan count of the color ink is not limited to four, and can be switched in accordance with the printing mode.

Determination of Dark Image Portion

In the first embodiment, the colorless ink discharge amounts in the first and second LUTs are set based on a combination of the color inks when input color information (R, G, and B signals) indicate a dark portion, as described with reference to FIG. 11A. As the information indicating a dark portion, the black (K) ink discharge amount is also applicable. In a region where the K ink is used, the gloss and tint readily change upon applying the colorless ink, similar to the dark image portion described in the first embodiment. Considering this, the CL discharge amount in the use of the K ink is set to be equal to or smaller than the reference value (equal to or smaller than A) in the gloss uniformity-oriented mode, and larger than A in the color reproducibility-oriented mode. Also in this case, the same effects as those in the first embodiment can be obtained.

Color Ink Discharge Amount

In the first embodiment, when the maximum color ink discharge amount is equal between the printing modes, the color reproductive range becomes wider in the color reproducibility-oriented mode, as shown in FIG. 13C. The present invention can widen the color reproductive range even in the gloss uniformity-oriented mode by changing the maximum color ink discharge amount between the printing modes.

For example, the sum of the discharge amounts of the color and colorless inks is equalized between the printing modes, and the maximum discharge amount of only the color ink in the gloss uniformity-oriented mode is set larger than that in the color reproducibility-oriented mode. FIGS. 14A and 14B show this example. FIGS. 14A and 14B show color ink discharge amounts with respect to the cyan line that are set as the first and second LUTs in the gloss uniformity-oriented mode and color reproducibility-oriented mode, respectively. Note that FIGS. 14A and 14B also show the colorless ink (CL) discharge amounts shown in FIGS. 11C and 11D. In FIGS. 14A and 14B, the total amount of the C and K inks is set larger especially at the dark image portion in the gloss uniformity-oriented mode of FIG. 14A because the CL discharge amount is smaller than that in the color reproducibility-oriented mode of FIG. 14B. Even in the gloss uniformity-oriented mode, the color reproductive range at the dark portion can be widened.

1-Pass Printing

Figure 15A:
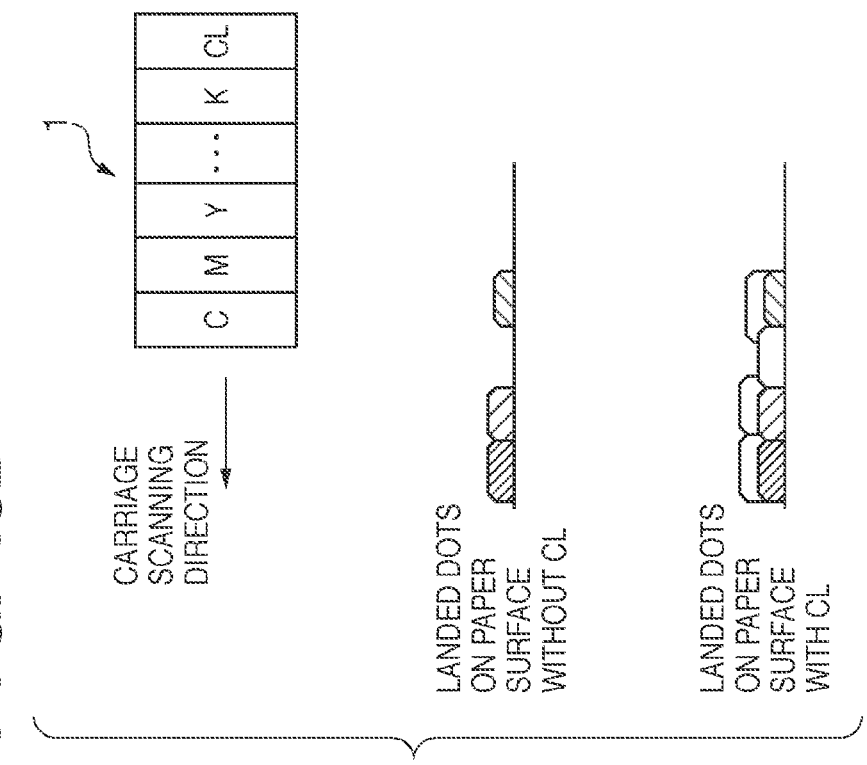
FIGS. 15A and 15B are views showing a printing head arrangement and printing direction in 1-pass printing.
Figure 15B:
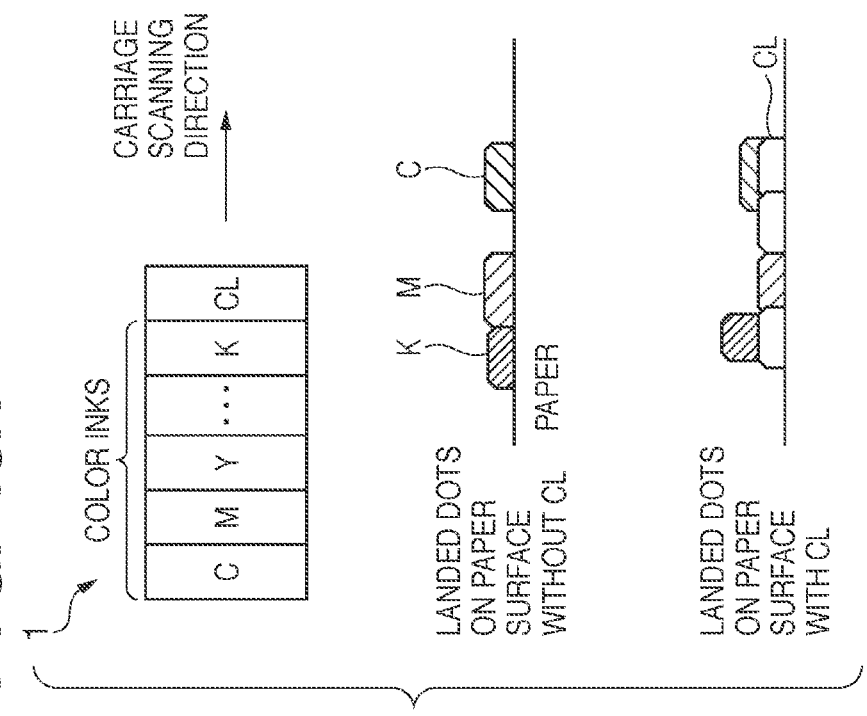

As the colorless ink printing method, the first embodiment has exemplified normal discharge printing and post-discharge printing in multi-pass printing. However, the present invention is not limited to multi-pass printing and is also applicable to a case in which an image is completed by one printing scan (to be referred to as 1-pass printing). For example, as shown in FIGS. 15A and 15B, a nozzle array at the right end that first prints in main scanning among a plurality of nozzle arrays of the printing head 1 is used for the colorless ink (CL). In normal discharge printing, as shown in FIG. 15A, the colorless ink is applied prior to the color ink by printing while scanning the printing head 1 from left to right in FIG. 15A. In post-discharge printing, as shown in FIG. 15B, the colorless ink is applied after the color ink by printing while scanning the printing head 1 from right to left. In this example, the nozzle array for the colorless ink is arranged at the right end (nozzle array which prints first in main scanning) of the printing head 1, but a reverse arrangement is also possible. More specifically, even when the nozzle array for the colorless ink is arranged at the left end (nozzle array which prints finally in main scanning), normal discharge printing and post-discharge printing can be controlled by scanning in a direction opposite to the above one. In this manner, the printing head includes a colorless ink nozzle at an end in the main scanning direction, and the scanning direction is changed depending on the printing mode. Even in 1-pass printing, the gloss and tint can be controlled similarly to the first embodiment.

Nozzle Array Length

In the first embodiment, the printing head 1 uses color and colorless ink nozzle arrays equal in length, as shown in FIG. 16A. Normal discharge printing and post-discharge printing of the colorless ink are controlled by switching the mask pattern. However, switching of normal discharge printing and post-discharge printing in the present invention is not limited to this example, and can also be achieved by the following method.

For example, as shown in FIGS. 16B and 16C, a printing head in which the nozzle array for the colorless ink is longer than that for the color ink is used. By switching the used nozzle position for the colorless ink, normal discharge printing and post-discharge printing can be controlled. In FIGS. 16B and 16C, hatched portions represent nozzle regions used in normal discharge printing and post-discharge printing.

Note that the color ink nozzle array length is equal between normal discharge printing and post-discharge printing.

In the embodiment, an interval is generated at the color ink printing timing in post-discharge printing with the colorless ink, as shown in FIG. 12. Owing to the use timing difference in the color ink nozzle array, the heterogeneity of color may occur between the printing modes. In such a case, printing with the colorless ink is enabled without switching the mask pattern, like the modification. Even in post-discharge printing with the colorless ink, nozzle arrays can be operated continuously without limiting the number of use nozzles of the color ink. Accordingly, the heterogeneity of color between the printing modes owing to the nozzle use timing difference in the color ink nozzle array can be suppressed while adjusting the gloss and tint of a printed image, similar to the first embodiment.

UI Settings

In the first embodiment described above, the printing mode can be set manually based on a user interface (UI) as shown in FIG. 17A. FIG. 17B shows the relationship between the printing mode and the scanning count in multi-pass printing at each printing quality. For example, when "quick" is selected as the printing quality, the total scanning count is set to eight. That is, in the gloss uniformity-oriented mode, an image is formed by eight printing scans for both the color and colorless inks. In the color reproducibility-oriented mode, an image is formed by four printing scans of the first half for the color ink and four printing scans of the second half for the colorless ink. When "fine" is selected as the printing quality, the total scanning count is set to 16. That is, in the gloss uniformity-oriented mode, an image is formed by 16 printing scans for both the color and colorless inks. In the color reproducibility-oriented mode, an image is formed by eight printing scans of the first half for the color ink and eight printing scans of the second half for the colorless ink.

Note that the CPU of the host apparatus may automatically determine either the gloss uniformity-oriented mode or color reproducibility-oriented mode based on other printing control information. According to the "post-discharge printing" method in the gloss uniformity-oriented mode, printing with the colorless ink starts after completion of printing with the color ink. To the contrary, according to the "normal discharge printing" method in the gloss uniformity-oriented mode, printing with the colorless ink starts before completion of printing with the color ink, so the throughput is high. In other words, when printing is done by the same number of passes for the color and colorless inks, the total number of passes becomes smaller in the "normal discharge printing" method. For this reason, it is also possible to set the gloss uniformity-oriented mode for printing quality information "quick", and the color reproducibility-oriented mode for printing quality information "standard" or "fine".

By allowing setting the contents of the printing quality and quality correction via the UI, more flexible image formation can be executed such that printing can be done by putting importance on color development while maintaining the throughput. Note that a printing mode other than the gloss uniformity-oriented mode and color reproducibility-oriented mode may be further executed as a printing mode executable by the printing apparatus. Also, a mode in which printing is performed using only the color ink without using the colorless ink may be adopted. It suffices to determine whether to use the colorless ink, based on user manual settings or automatic settings based on the type of printing paper.

Other Embodiments

The above embodiment has described the present invention by exemplifying the inkjet printing system in FIG. 6, but an application of the present invention is not limited to this arrangement. It does not matter which of the host apparatus and printer includes, of the functions shown in FIG. 6, an arrangement for implementing image processing up to mask processing (generation of binary data). Further, the printing mode input settings (UI settings) described with reference to FIG. 17 may be executed not in the host apparatus but in the inkjet printer.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-086467, filed Apr. 2, 2010, which is hereby incorporated by reference herein in its entirety.

What is claimed is:

1. A printing apparatus which prints an image by scanning a printing head relative to a printing medium, the printing head discharging color inks of a plurality of colors containing pigment color materials and a colorless ink, the apparatus comprising:
a color conversion unit configured to convert image data to be printed into ink color data regarding the respective colors of the color inks and the colorless ink; and
a printing unit configured to print an image based on the ink color data in a first printing mode in which discharge of the colorless ink to a predetermined area starts before completion of printing with the color inks to the predetermined area, or a second printing mode in which discharge of the colorless ink to the predetermined area starts after completion of printing with the color inks to the predetermined area,
wherein said color conversion unit converts the image data into ink color data in the first printing mode and ink color data in the second printing mode to set a discharge amount of the colorless ink in the first printing mode for a dark portion where lightness indicated by the image data becomes smaller than a predetermined value, to be smaller than a discharge amount of the colorless ink set for the dark portion in the second printing mode.

2. The apparatus according to claim 1, wherein the dark portion occupies a half region of an entire range of a possible color space of the image data.

3. The apparatus according to claim 1, wherein the dark portion includes a range of a signal value at which a black ink discharge amount is generated in image formation in the image data.

4. The apparatus according to claim 1, wherein said color conversion unit converts the image data into ink color data in the first printing mode to set the discharge amount of the colorless ink for the dark portion to be not larger than a preset reference value, and into ink color data in the second printing mode to set the discharge amount of the colorless ink for the dark portion to be larger than the reference value.

5. The apparatus according to claim 4, wherein the reference value indicates an amount of the colorless ink at which glossiness of a printed surface does not decrease when the colorless ink is applied to the printing medium.

6. The apparatus according to claim 1, further comprising a setting unit configured to set the first printing mode or the second printing mode on the basis of user's indication.

7. The apparatus according to claim 1, further comprising a determination unit configured to determine the first printing mode or the second printing mode in accordance with information about printing quality.

8. The apparatus according to claim 1, wherein said color conversion unit converts the image data to maximize the discharge amount of the colorless ink with respect to highest lightness of the image data in the first printing mode and the second printing mode.

9. The apparatus according to claim 1, wherein said color conversion unit converts the image data to set a maximum discharge amount of the color ink in ink color data in the first printing mode to be larger than the maximum discharge amount of the color ink in ink color data in the second printing mode.

10. A printing method of printing an image by scanning a printing head relative to a printing medium, the printing head discharging color inks of a plurality of colors containing pigment color materials and a colorless ink, the method comprising:
a color conversion step of converting image data to be printed into ink color data regarding the respective colors of the color inks and the colorless ink; and
a printing step of printing an image based on the ink color data in a first printing mode in which discharge of the colorless ink to a predetermined area starts before completion of printing with the color inks to the predetermined area, or a second printing mode in which discharge of the colorless ink to the predetermined area starts after completion of printing with the color inks to the predetermined area,
wherein in the color conversion step, the image data is converted into ink color data in the first printing mode and ink color data in the second printing mode to set an discharge amount of the colorless ink in the first printing mode for a dark portion where lightness indicated by the image data becomes smaller than a predetermined value, to be smaller than a discharge amount of the colorless ink set for the dark portion in the second printing mode.

11. A data generating apparatus which generates ink color data, for printing an image with a printing head based on the ink color data in a first printing mode in which discharge of a colorless ink to a predetermined area starts before completion of printing with color inks of a plurality of colors containing pigment color materials to the predetermined area, or a second printing mode in which discharge of the colorless ink to the predetermined area starts after completion of printing with the color inks to the predetermined area, the data generating apparatus comprising:
a color conversion unit configured to convert image data to be printed into ink color data regarding the respective colors of the color inks and the colorless ink;
wherein said color conversion unit converts the image data into ink color data in the first printing mode and ink color data in the second printing mode to set a discharge amount of the colorless ink in the first printing mode for a dark portion where lightness indicated by the image data becomes smaller than a predetermined value, to be smaller than a discharge amount of the colorless ink set for the dark portion in the second printing mode.

* * * * *